United States Patent
Hyde et al.

(10) Patent No.: US 9,727,890 B2
(45) Date of Patent: Aug. 8, 2017

(54) SYSTEMS AND METHODS FOR REGISTERING ADVERTISEMENT VIEWING

(71) Applicant: Elwha LLC, Bellevue, WA (US)

(72) Inventors: Roderick A. Hyde, Redmond, WA (US); Andrew Forsyth Glew, Hillsboro, OR (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/602,101

(22) Filed: Jan. 21, 2015

(65) Prior Publication Data

US 2015/0130919 A1    May 14, 2015

Related U.S. Application Data

(63) Continuation of application No. 13/472,330, filed on May 15, 2012, now Pat. No. 8,947,515.

(51) Int. Cl.
*H04N 7/18* (2006.01)
*G06Q 30/02* (2012.01)
*H04N 5/225* (2006.01)
*H04N 21/442* (2011.01)
*H04N 21/81* (2011.01)

(52) U.S. Cl.
CPC ......... *G06Q 30/0241* (2013.01); *H04N 5/225* (2013.01); *H04N 7/18* (2013.01); *H04N 7/181* (2013.01); *H04N 21/44218* (2013.01); *H04N 21/812* (2013.01)

(58) Field of Classification Search
CPC .................................................. G06Q 30/0241
USPC .......................................................... 348/78
See application file for complete search history.

(56) References Cited

U.S. PATENT DOCUMENTS

| | | | |
|---|---|---|---|
| 4,659,314 A | 4/1987 | Weinblatt | |
| 6,830,187 B2 | 12/2004 | Rathus et al. | |
| 6,843,411 B2 | 1/2005 | Rathus et al. | |
| 6,843,419 B2 | 1/2005 | Rathus et al. | |
| 7,147,160 B2 | 12/2006 | Rathus et al. | |
| 7,600,691 B2 | 10/2009 | Rathus et al. | |
| 2006/0065733 A1 | 3/2006 | Lee et al. | |
| 2006/0240862 A1 | 10/2006 | Neven et al. | |
| 2007/0013776 A1* | 1/2007 | Venetianer | G06K 9/00771 348/143 |
| 2007/0282682 A1 | 12/2007 | Dietz et al. | |
| 2008/0059994 A1 | 3/2008 | Thornton et al. | |
| 2009/0019472 A1 | 1/2009 | Cleland et al. | |
| 2009/0088202 A1 | 4/2009 | Toomer et al. | |
| 2009/0156907 A1 | 6/2009 | Jung et al. | |
| 2010/0092095 A1 | 4/2010 | King et al. | |
| 2010/0133332 A1 | 6/2010 | Rathus | |
| 2010/0133333 A1 | 6/2010 | Rathus | |
| 2010/0191631 A1* | 7/2010 | Weidmann | G06F 3/013 705/34 |

(Continued)

*Primary Examiner* — Richard Torrente
(74) *Attorney, Agent, or Firm* — Foley & Lardner LLP

(57) ABSTRACT

An apparatus for identifying active access, by a viewer, of a source containing an advertisement includes a video capture device for recording user interaction in an area and a video processor electrically coupled to the video capture device. The video processor is configured to analyze the video obtained by the video capture device. The video process analysis includes identification of active access, by the viewer, of the source containing the advertisement. The source is electrically decoupled from the video capture device.

32 Claims, 3 Drawing Sheets

(56) References Cited

U.S. PATENT DOCUMENTS

| | | |
|---|---|---|
| 2010/0226535 A1* | 9/2010 | Kimchi .................. G06F 3/013 382/103 |
| 2011/0191631 A1 | 8/2011 | Suzuki et al. |
| 2011/0263946 A1 | 10/2011 | El Kaliouby et al. |
| 2013/0103624 A1 | 4/2013 | Thieberger |

* cited by examiner

SYSTEMS AND METHODS FOR REGISTERING ADVERTISEMENT VIEWING

CROSS-REFERENCE TO RELATED PATENT APPLICATIONS

The present application is a continuation of U.S. application Ser. No. 13/472,330, filed May 15, 2012, which is incorporated herein by reference in its entirety.

BACKGROUND

Targeted advertising allows advertisement content producers to provide content to viewers in a more efficient manner. However, the proper audience for an advertisement is not always readily apparent and obtaining information about the proper audience may be time consuming and labor intensive.

Electronic information providers attempt to increase the efficiency of their advertisements by taking advantage of information about viewers based on access to the electronic content. This advantage may not be seized by traditional print content providers or other electronic media providers that are unable to learn from a user's interaction with the medium. However, since a significant portion of the value for information sources such as print media remains in the ability to advertise through the media, the ability to effectively advertise or increase the efficiency of such advertisements substantially impacts the value and hence the continued existence of such media.

SUMMARY

The inventors have appreciated that monitoring systems and information obtained from such systems may be accessed, processed, or implemented to obtain valuable information, which may be used to substantially increase the effectiveness of advertisements and provide useful information through a passive resource. In view of the foregoing, the present disclosure is directed to apparatuses and methods for identifying access, by a viewer, of a source containing an advertisement.

In one exemplary inventive embodiment, the apparatus for identifying active access, by a viewer, of a source containing an advertisement includes a video capture device for recording user interaction in an area. The apparatus also includes a video processor electrically coupled to the video capture device. The video processor is configured to analyze the video obtained by the video capture device. The video processor analysis includes identification of active access, by the viewer, of the source containing the advertisement. The source is electrically decoupled from the video capture device.

The analysis may include identification of the source. The source may be identified by the name of a publication or by the issue of the publication. The source identification may include identifying an image on the source.

The source may be a magazine, a newspaper, an electronic device, a mobile computing device, a display device, a television.

The video processing device may identify active access of the source by identifying a touching of the source by the viewer, opening the source by the viewer, picking up the source by the viewer, or actively manipulating the source by the viewer The analysis of the video processor may include identification of an accessed advertisement in the source by the user. The accessed advertisement may be identified based on a page number in the source. The video processor analysis may include identifying information about the access of the advertisement. The information about the access may include duration, time accessed, data accessed, and location of the access.

The analysis of the video processor may include identifying information about the viewer accessing the advertisement. The information identified about the viewer accessing the advertisement may include demographic information. The information identified about the viewer accessing the advertisement may include gender, an assessment of age, identification of viewer clothing or apparel, an assessment of ethnicity, or the viewer's name. The viewer's name may be obtained from a database associated with the area within which the source is accessed. The area may be a waiting room, a store, or another publicly accessible location.

The video processor of the apparatus may be electrically coupled to a database including a list of advertisements contained in a publication or another electronic database.

The video processor of the apparatus may complete analysis that includes identifying the viewer using a facial recognition process.

The video processor of the apparatus may complete analysis that includes identifying the viewer based on a signal transmitted by the user's mobile phone.

The video processor of the apparatus may be electrically coupled to an electronic database and the processor may be configured to cause transmission of information obtained from analysis of the video to the electronic database. The information obtained from the analysis of the video may be made accessible from the electronic database in exchange for a fee.

The video processor of the apparatus may be coupled to a plurality of video capture devices having a plurality of vantages. The video processor may be configured to analyze a video obtained by the plurality of video capture devices to identify and analyze active access, by the viewer, of the source containing the advertisement.

One exemplary inventive embodiment provides a system for identifying active access, by a viewer, of a source containing an advertisement. The system includes a video footage database providing access to a video file. The video file is obtained from a video capture device having a vantage of a source of advertising content. The source of the advertising content is electrically decoupled from the video capture device. The system also includes a processor connected to the video footage database. The processor is configured to analyze the video file in the video footage database and to identify active access, by the viewer, of the source.

Another exemplary inventive embodiment provides a method of identifying active access, by a viewer, of a source containing an advertisement. The method includes identifying, using a video capture device, the source and the viewer. The source is electrically decoupled from the video capture device. The method further includes identifying active access of the source, by the viewer and storing, on a storage device, the identification of the source and information related to active access of the source, by the viewer.

Yet another exemplary inventive embodiment provides a method of identifying access of an advertisement by a user. This method includes obtaining video footage from a video capture device positioned to have a field of view inclusive of the source. This method further includes processing the video footage to identify active access of the source by the viewer and causing, by a processing device, storage of information associated with identification of access of the source by the viewer on a storage device.

On exemplary inventive embodiment provides a computer program product. The computer program product includes computer readable code stored on a tangible storage medium. The computer readable code forms a computer program executable by a computer for identifying active access, by a viewer, of a source containing an advertisement. The computer program includes computer code for obtaining video footage from a video capture device positioned to have a field of view inclusive of the source, computer code for processing the video footage to identify active access of the source by the viewer, and computer code for causing storage of information associated with identification of active access of the source by the viewer on a storage device.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE FIGURES

The skilled artisan will understand that the drawings primarily are for illustrative purposes and are not intended to limit the scope of the inventive subject matter described herein.

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive systems, methods and apparatus identifying active access, by a viewer, of a source containing an advertisement. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
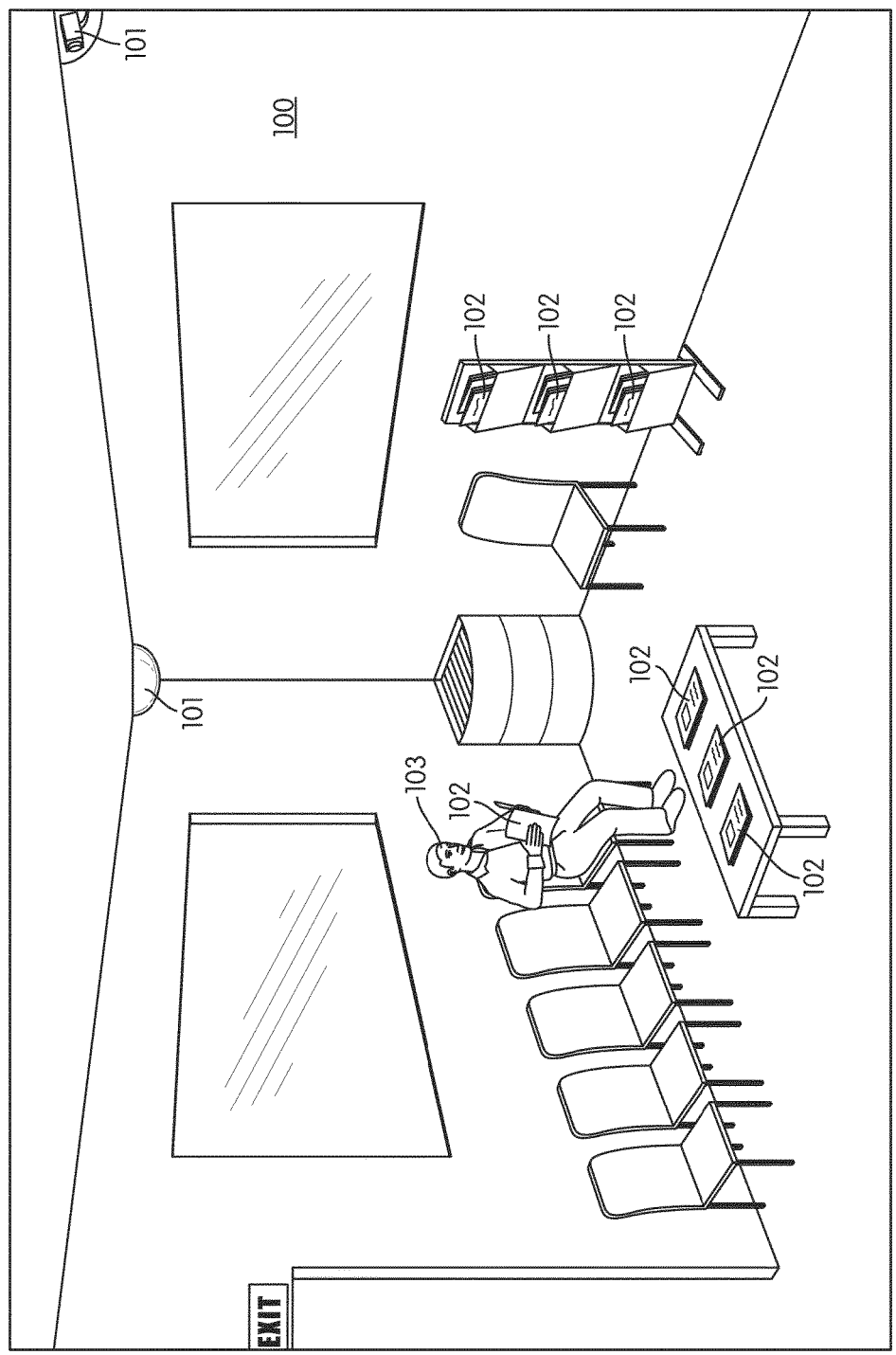
FIG. 1 illustrates a public setting within which an inventive embodiment may be implemented.

FIG. 1 illustrates a public setting within which an inventive embodiment may be implemented. FIG. 1 illustrates a waiting room area 100. The waiting room includes a camera 101, which may be an ordinary surveillance camera. Camera 101 may be either a digital or analog camera as various inventive embodiments are implemented through the use of existing video capture technology that resides in a particular area. As discussed further herein, the processing power and capabilities may be implemented at a location remote from the camera and the video footage obtained from the camera may be digitized. Camera 101 may be positioned within waiting area 100 such that it has a vantage of a substantial portion of the room including areas where a patient or other member may sit. In some embodiments, area 100 may include a plurality of cameras 101, which cameras may be visible or inconspicuously disposed within area 100. In some inventive embodiments, for example, camera 101 may be disposed behind a wall, roof tile, panel, a one-way glass, picture, or other object. In some embodiments, camera 101 may be disposed within a rack such as magazine rack 104.

Camera 101 may be used to assess the activities of one or more viewers 103 in area 100. More specifically, video footage obtained by camera 101 may be analyzed to determine interactions of viewer 103 with sources 102 containing advertising content. The video footage may be analyzed after any interactions have occurred. For example, video footage could be uploaded from camera 101 on a daily basis and processing of the video could occur after the upload has been initiated. The video footage may include a series of still frames or images, for example pictures take at 1 second intervals, or video footage obtained at 30 Hz. In other inventive embodiments, camera 101 may be configured to continuously upload or stream video footage to a video footage database throughout a day and the analysis to identify and determine interactions between the users and source 102 may be implemented on an ongoing basis. While sources 102 are depicted as paper sources in FIG. 1, inventive embodiments disclosed herein also include other forms of advertising inclusive sources. For example, camera 101 may also be used to assess activity of a user in area 100 related to the user's use of a mobile computing device such as a mobile phone, laptop, or tablet (i.e., by visual analysis rather than by receiving electronic data from the mobile computing device itself). Camera 101 may also assess activity of a viewer by tracking the eyes of viewer 103 to determine the location on a page of a magazine that a viewer is viewing. Camera 101 may also be connected to a database containing records of the place where the camera is positioned and may use the database of records to determine the identity of a viewer (e.g., by correlating an image with a record of patients having doctor's appointments for the day). In some inventive embodiments camera 101 may be movable and may be configured to track the movement of viewer 103.

Figure 2:
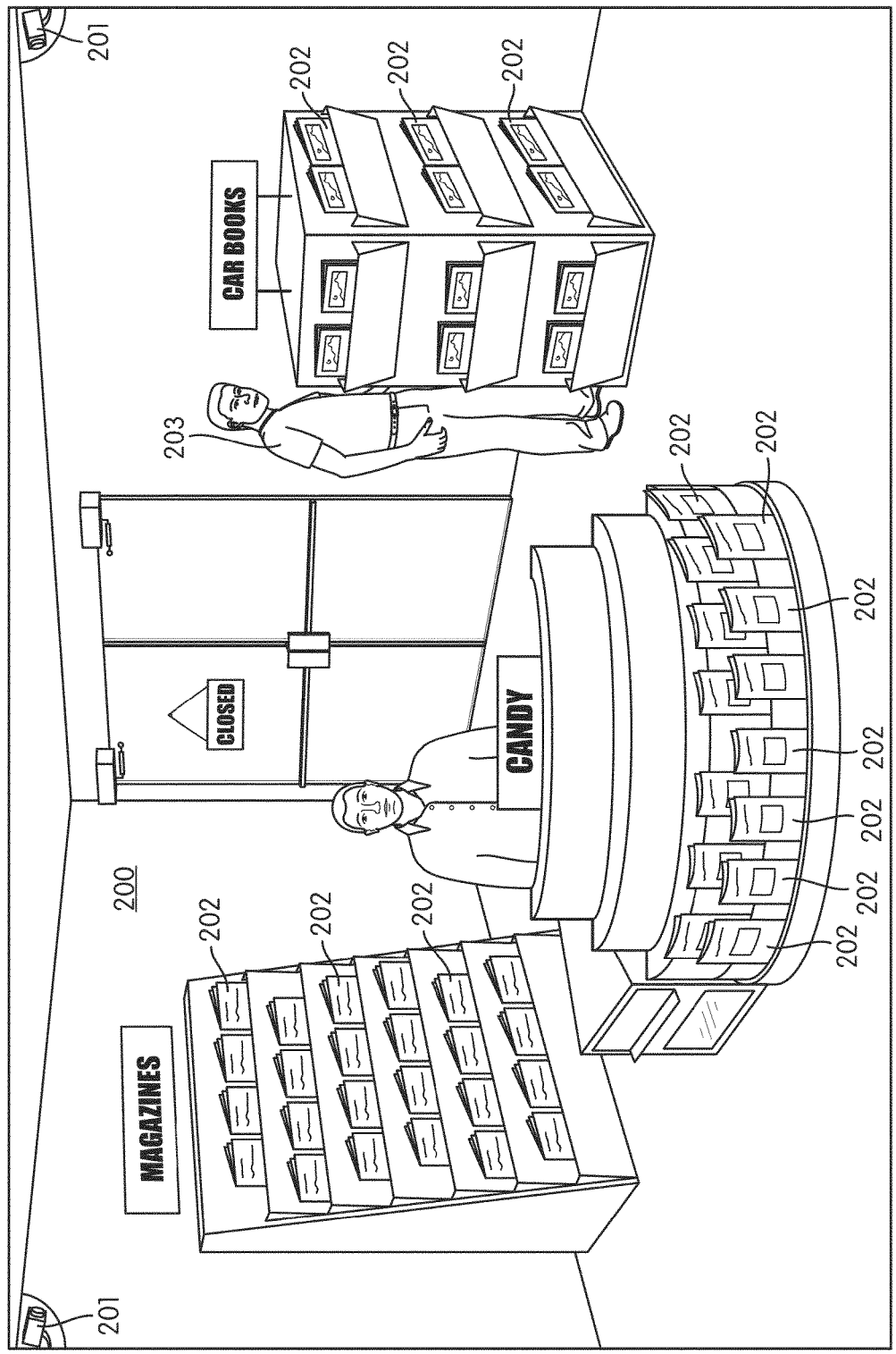
FIG. 2 illustrates another public setting within which an exemplary inventive embodiment may be implemented.

FIG. 2 illustrates another public setting within which an inventive embodiment may be implemented. The area 200 depicted in FIG. 2 includes a magazine stand that may be located in an area such as an airport, a book store, a mall, or in an indoor or outdoor shopping region. The magazine stand provides a wide variety of sources 202, which may be actively accessed by one or more viewers 203 and as such provides an environment that is ripe for obtaining information about user access to advertising content. Actively accessing a source includes some type of user manipulation of the source. For example, active access of a magazine includes, picking up and opening the magazine and active access of an electronic device includes manipulating one or more control components of the device such as a mouse or track pad, a keyboard, a touch sensitive display, etc. Actively accessing content, such as an advertisement within a source includes engagement of the content through actively accessing the source. Area 200 may include a plurality of cameras 201 positioned to have distinct fields of view or vantages to access one or more viewers from different perspectives. Information from the video files obtained from each camera may be combined to obtain a complete set of information about a single user's access of a particular source. The access information obtained from the one or more cameras 201 may include a variety of information including identification of the source, which may be achieved through image recognition of, for example, a cover page of a magazine source, identification of a bar-code (1-D or 2-D) on the source or the advertisement, identification of the duration of the access, identification of pages accessed within the source, identification of the location the access took place at, identification of the time the access occurred, and identification of specific content accessed within the source. Similarly, the access information may include one or more details about the viewer accessing the source. Sources 202 may include electrically identifiable tags such as RFID (radio-frequency identification) tags in accordance with various inventive embodiments. The RFID tags may be used to track or identify the source. In some embodiments, the information obtained regarding the content of source 202 may be used to prohibit access by an identified viewer (e.g., if a camera identifies access of a particular adult magazine by a child).

While sources 202 are depicted as paper or non-electronic sources in FIG. 2, inventive embodiments disclosed herein also include analyzing active access to other forms of advertisement inclusive sources including personal mobile computing devices or electronic sources disposed within an area such as personal or laptop computers or other display devices that are distinct and separate or electronically decoupled from camera 201. In various inventive embodiments camera video footage obtained by camera 201 may be used to analyze access to forms of content provided in sources 202 that are exclusive of advertisements, such as access to a specific type of picture, a specific article, or other content obtained within the source. Analyzing access to content other than advertisements may be used for various purposes including, but not limited to, research studies related to the content or viewers of the content.

Figure 3:
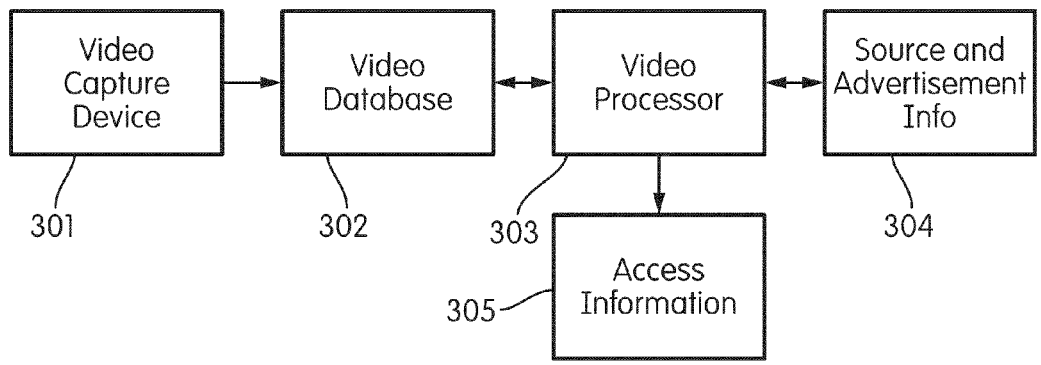
FIG. 3 provides a schematic of various components of an exemplary inventive embodiment.

FIG. 3 provides a schematic of various components of an exemplary inventive embodiment. FIG. 3 demonstrates the process of obtaining active access information in an area such as the areas depicted in FIGS. 1 and 2. The components shown in FIG. 3 include a video capture device 301 such as a video camera, surveillance camera, web camera, etc. The video capture device 301 is electronically coupled to a video storage database 302 for storing video files. The video storage database may include a memory device, including but not limited to an optical computer memory or solid state computer memory. The video storage database 302 may be accessed by a video processor 303 which may be remotely located with respect to database 302 or which may be within the same device as database 302. The video processor may be electrically coupled to the database to both obtain files from the database and to transmit files to the database. Video processor 303 may also be electrically coupled to one or more other databases containing information about one or more sources identified from the video files. For example, if the processor 303 identifies an accessed source as being a particular magazine, the processor may then access a database containing information about the content of that source, which information may be integrated with other information obtained from the video file to determine what advertisement content a viewer may have accessed within the source. The database may, for example, contain a list of advertisements within specific issues of a magazine, including their page numbers, their location on the page or in relation to other content, or information concerning the general appearance of the advertisement (e.g., size, shape, aspect ratio, color spectra), which can aid the processor in the identification of the advertisement.

The video processor 303 may also be connected to a storage database within which the processor may cause access information to be stored. For example, when the processor 303 has completed a particular analysis, the processor 303 may compile the information into a separate data file, for example a file that provides information such as the identity of the source, the identity of demographic information about the user accessing the source, or the identity of content accessed within the source, which file may be of interest to the source and advertisement content provider. The database containing access information obtained from an analysis of the video footage or video file may be made accessible to the content provider for a fee, which fee may be based on the amount of information relevant to the content or source provided and/or the amount of information accessed within the database.

Figure 4:
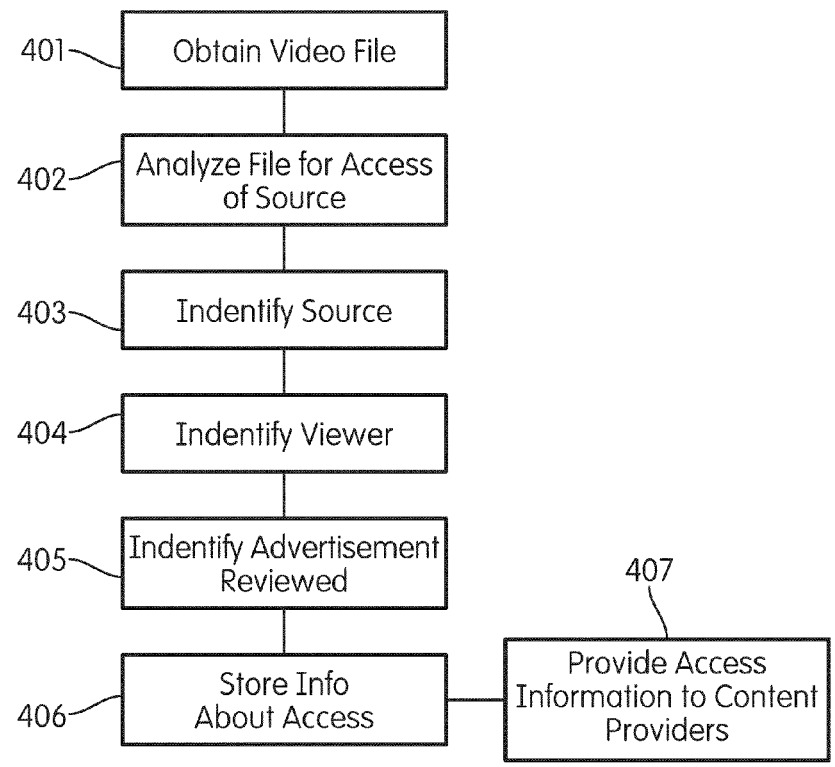
FIG. 4 provides a flow diagram of an exemplary process for implementation of an inventive embodiment.

FIG. 4 provides a flow diagram of an exemplary process for implementation of an inventive embodiment. In step 401 of the process a video file is obtained. The file may be obtained at set intervals from a database. The database containing the video file may be polled on an ongoing basis to determine if new files are available. The file may be obtained in process 401 directly from the database or from the video capture device. Once the file is accessible, the file is analyzed in step 402 to determine whether or not active access to a source containing advertising content may be identified in the video file. The analysis may be completed by a dedicated video analysis processor in step 402. The analysis may occur at a central location remote from one or more video capture devices and/or video storage databases. The analysis may include one or more stages of review of the video file. The analysis may include an identification of a viewer, the identification of a source, and the identification of active access by the viewer of the source. Identification of active access by the viewer of the source may be determined by one or more defined contact interactions, which actions may be defined based on objection recognition, orientation of the object, and/or positions of the objects, including the source and the viewer with respect to one another.

Once an active access is identified or categorized, the access may be further characterized by an identification of the source in step 403, by an identification of the viewer in step 404, or by an identification of the specific content accessed in the source in step 405. For example, if a magazine is touched by the viewer and the magazine is opened, the access may be characterized as reading access and the duration of the access or other information about the access may be determined and stored. The viewer may be identified based on one or more pieces of assessable information such as gender, age, and ethnicity. These characteristics may be estimated based on various physical attributes.

Once information about the access is identified, the information may be stored in an access database in step 406. In step 407, access may be provided to the database. For example, an electronic communication may be transmitted to various sources or advertisement content providers indicating that new information about access to the content has been obtained, which communication might invite the content provider to access the information for a fee. Alternatively, or additionally the database may simply be maintained passively and content or source providers may access it as desired and the amount of access and the amount of information obtained may be used to determine the fee for accessing the information.

While various inventive embodiments have been described and illustrated herein, those of ordinary skill in the art will envision a variety of other structures for performing the function or obtaining the results or one or more of the advantages described herein, and each of such variations or modifications is deemed to be within the scope of the inventive embodiments described herein. More generally, those skilled in the art will appreciate that all parameters, dimensions, materials, and configurations described herein are meant to be exemplary and that the actual parameters, dimensions, materials, and configurations will depend upon the specific application or applications for which the inventive teachings are used. Those skilled in the art will recognize equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and method described herein. In addition, any combination of two or more such features, systems, articles, materials, kits, and methods, if such features, systems, articles, materials, kits, and methods are not mutually inconsistent, is included within the inventive scope of the present disclosure.

The above-described embodiments of the invention can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single computer or distributed among multiple computers.

In this respect, various aspects of the invention may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. An apparatus for identifying active access, by a viewer, of a source containing an advertisement, the apparatus comprising:
   a video capture device for recording viewer interaction in an area to a video; and
   a processor electrically coupled to the video capture device, the processor configured to analyze the video obtained by the video capture device, the processor configured to identify active access by the viewer of the source containing the advertisement by (1) using image recognition to identify content in the source from the video by comparing the content in the source to information stored in a database and (2) tracking at least one eye of the viewer to determine that the viewer is actively viewing the content in the source, wherein the content in the source includes an advertisement.

2. The apparatus according to claim 1, wherein the analysis further includes identification of the source.

3. The apparatus according to claim 2, wherein identification of the source includes identifying the name of a publication.

4. The apparatus according to claim 2, wherein the processor is configured to identify the source via a two dimensional bar code on the source.

5. The apparatus according to claim 1, wherein the video capture device tracks the source via a RFID tag disposed on the source.

6. The apparatus according to claim 1, wherein the identification of active access is signaled at least partially by the viewer touching the source.

7. The apparatus according to claim 1, wherein the identification of active access is signaled at least partially by the viewer actively manipulating the source.

8. The apparatus according to claim 1, wherein the processor analysis includes identifying information about the active access by the viewer of the advertisement, and wherein the identifying information includes a duration of access.

9. The apparatus according to claim 1, wherein the processor analysis includes identifying information about the active access of the advertisement, and wherein the identifying information includes a time accessed.

10. The apparatus according to claim 1, wherein the processor analysis includes identifying information about the active access of the advertisement, and wherein the identifying information includes a date accessed.

11. The apparatus according to claim 1, wherein the processor analysis includes identifying information about the active access of the advertisement, and wherein the identifying information includes a specific location of access.

12. A system for identifying active access of a source containing an advertisement, the system comprising:
- a memory storing a video file, the video file obtained from a video capture device having a vantage of a source of advertising content, the source electrically decoupled from the video capture device; and
- a processor coupled to the memory, the processor configured to analyze the video file in the memory and to identify active access, by a viewer, of the source containing the advertisement by (1) using image recognition on the video file to identify content in the source video by comparing the content in the source to information stored in a database and (2) tracking the eyes of the viewer to determine that the viewer is actively viewing the content in the source, wherein the content includes an advertisement.

13. The system according to claim 12, wherein the processor is configured to identify the active access based on tracking at least one eye of the viewer.

14. The system according to claim 13, wherein the identified active access indicates that the viewer is viewing the advertisement of the source.

15. The system according to claim 13, wherein the identified active access indicates that the viewer is viewing a specific location on the source.

16. The system according to claim 13, wherein the identified active access indicates that the viewer is viewing a specific page of the source.

17. The system according to claim 12, wherein the analysis further includes identification of the source.

18. The system according to claim 17, wherein the identification of the source includes identifying the name of a publication.

19. The system according to claim 12, wherein the processor is configured to identify the source via a two dimensional bar code on the source.

20. The system according to claim 12, wherein the actively accessed advertisement is identified based at least in part on a visual attribute.

21. The system according to claim 12, wherein the identification of active access is signaled, at least in part, by the viewer touching the source.

22. The system according to claim 12, wherein the identification of active access is signaled, at least in part, by the viewer opening the source.

23. The system according to claim 12, wherein the identification of active access is signaled, at least in part, by the viewer actively manipulating the source.

24. The system according to claim 12, wherein the processor analysis includes identifying information about the active access of the advertisement.

25. The system according to claim 24, wherein the information includes duration.

26. The system according to claim 24, wherein the information includes time accessed.

27. A method of identifying active access of an advertisement by a viewer, the method comprising:
- obtaining video footage from a video capture device having a field of view inclusive of a source of the advertisement;
- identifying active access of the source by the viewer of the source by (1) using image recognition on the video footage to identify content in the source by comparing the content in the source to information stored in a database and (2) tracking the eyes of the viewer to determine that the viewer is actively viewing the content in the source, wherein the content in the source includes an advertisement; and
- causing, by a processing device, storage of information associated with the identification of the active access of the source by the viewer on a storage device.

28. The method according to claim 27, further comprising identifying the source actively accessed by the viewer.

29. The method according to claim 27, further comprising signaling the identification of active access, at least in part, by the viewer touching the source.

30. The method according to claim 27, further comprising signaling the identification of active access, at least in part, by the viewer opening the source.

31. The method according to claim 27, further comprising signaling the identification of active access, at least in part, by the viewer picking up the source.

32. The method according to claim 27, further comprising accessing, via the processing device, a database including a list of advertisements contained in a publication.

* * * * *